(12) United States Patent
Ackerman et al.

(10) Patent No.: US 8,782,608 B2
(45) Date of Patent: Jul. 15, 2014

(54) SYSTEM AND METHOD OF IDENTIFYING AND TRACKING SOFTWARE PATTERN METRICS

(75) Inventors: Lee Murray Ackerman, Calgary (CA); Christopher Henry Gerken, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1115 days.

(21) Appl. No.: 12/140,582

(22) Filed: Jun. 17, 2008

(65) Prior Publication Data
US 2009/0313609 A1    Dec. 17, 2009

(51) Int. Cl.
*G06F 9/44*    (2006.01)
(52) U.S. Cl.
USPC ................... 717/127; 717/131; 717/123
(58) Field of Classification Search
None
See application file for complete search history.

(56) References Cited

U.S. PATENT DOCUMENTS

| | | | |
|---|---|---|---|
| 6,658,654 B1* | 12/2003 | Berry et al. | 717/131 |
| 6,851,105 B1* | 2/2005 | Coad et al. | 717/106 |
| 7,975,257 B2* | 7/2011 | Fanning et al. | 717/124 |
| 2003/0014408 A1* | 1/2003 | Robertson | 707/6 |
| 2004/0123274 A1* | 6/2004 | Inagaki et al. | 717/128 |
| 2004/0153832 A1* | 8/2004 | Hasha | 714/38 |
| 2004/0163079 A1* | 8/2004 | Noy et al. | 717/154 |
| 2004/0230964 A1* | 11/2004 | Waugh et al. | 717/168 |
| 2005/0097517 A1* | 5/2005 | Goin et al. | 717/124 |
| 2005/0125772 A1* | 6/2005 | Kohno | 717/104 |
| 2006/0069702 A1* | 3/2006 | Moeller et al. | 707/200 |
| 2007/0016830 A1* | 1/2007 | Hasha | 714/38 |
| 2008/0034349 A1* | 2/2008 | Biswas et al. | 717/121 |
| 2009/0164270 A1* | 6/2009 | Seidman | 705/7 |

OTHER PUBLICATIONS

T. Kobayashi and M. Saaki, "Software Development Based on Software Pattern Evolution", Proceedings of the 6th Asia-Pacific Software Engineering Conference, pp. 18-25, 1999.*
Antoniol et al. "Design Pattern Recovery in Object-Oriented Software", IEEE, 1998.*
Amiot et al. "Instantiating and Detecting design Patterns: Putting Bits and Pieces Together", IEEE, 2001.*
Henninger et al. "Software Pattern Communities: Current Practices and Challenges", CSE Technical reports, 2007.*

* cited by examiner

*Primary Examiner* — Li B Zhen
*Assistant Examiner* — Viva Miller
(74) *Attorney, Agent, or Firm* — Holland & Knight LLP; Brian J. Colandreo, Esq.; Jeffrey T. Placker, Esq.

(57) ABSTRACT

This disclosure relates to software patterns, and more particularly, to the tracking of software pattern metrics. A system or method may query a software environment to determine the type of use of, and identify, at least one software pattern. The system or method may also collect at least one software pattern metric, and determine the impact of the at least one software pattern within an environment. The system or method may also store software pattern information and recall software pattern information.

18 Claims, 2 Drawing Sheets

SYSTEM AND METHOD OF IDENTIFYING AND TRACKING SOFTWARE PATTERN METRICS

TECHNICAL FIELD

This disclosure relates to software patterns, and more particularly, to the tracking of software pattern metrics.

BACKGROUND

The use of software patterns ("patterns") may improve the software development process. A pattern may be a proven, best practice solution to a known problem within a given context. For example, a pattern may be a general, reusable, customizable design solution to a software design problem that may take the form of a description, template, model, code sample, or other mechanism that facilitates a design solution. Different types of patterns exist. For example, an idiom pattern may include sections of software code, a design pattern may include various software classes, and an architectural pattern may provide an architectural level solution. Some patterns are well known in the art; for example, the Model-View-Controller pattern is a well known architectural pattern. In many cases, a pattern can describe relationships and interactions between classes and/or objects without specifying a final solution. Indeed, a pattern, when instantiated, may benefit a code developer by facilitating a design solution, but the pattern may also lend itself to customization so that the code developer can tailor the pattern to his or her specific application.

The application of patterns within a software project has been, primarily, a manual process. Patterns may be distributed to team members who are interested in using the pattern. The impetus to evaluate and/or apply the pattern then falls on the team and/or team members. Some patterns may be more useful than others within a particular context, and the manual evaluation of patterns can be burdensome on individuals or teams that may wish to implement a pattern.

As with any asset, the maintenance, documentation, creation, and management of patterns consumes money and resources. Since patterns are reusable assets, opportunities to improve efficiency of the maintenance and use of patterns exist. However, identification and tracking of those opportunities is often difficult. A developer or organization that utilizes patterns will likely want to minimize the cost associated with pattern maintenance. The collection, maintenance, and evaluation of pattern metrics may allow an individual or organization to efficiently manage pattern assets.

SUMMARY OF DISCLOSURE

In an implementation, a method of tracking software pattern metrics includes querying a software environment to determine the type of use of at least one software pattern. At least one software pattern metric is collected. An impact of the at least one software pattern within a development environment based on, at least in part, the at least one software pattern metric is determined.

The method may also include one of more of the following features. Information about the impact of the at least one software pattern may be provided. At least one software pattern may comprise a software recipe. Querying the software environment may include one or more of: identifying one or more software patterns registered within the software environment, identifying function calls made to instantiate a software pattern, and identifying function calls made by at least one instantiated software pattern. The impact of the software pattern may be based upon, at least in part, one or more of: a number of input parameters, a number of output parameters, a subsidiary use of the output of the software pattern, a ratio of the size of an input model to the size of an output model, a ratio of inputs of the software pattern to outputs of the software pattern, a number of dependent software patterns, a type of use within a development process, a number of subsidiary elements used within the software pattern, a type of subsidiary elements used within the software pattern, a number of output artifacts without modification, and a determination of the type of software pattern. The type of software pattern may include one or more of a modeling software pattern type, a software code type, and a text based artifact type.

One or more software pattern metrics may include one or more of: a number of pattern implementations, a time between instantiations of the software pattern, a number of instantiations of the software pattern, a per capita number of instantiations of the software pattern by at least one user, a number of reapplications of the software pattern, a number of modified regions within an output artifact of the software pattern, a determination of whether the software pattern is used during development of the software pattern, a history of check-ins and check-outs of the software pattern, a history of check-ins and check-outs of artifacts related to the software pattern, a measure of retention of output artifacts of the software pattern, a measure of deletion of output artifacts of the software pattern, a number of input parameters that are the same across multiple instantiations of the software pattern, a number of output parameters that are the same across multiple instantiations of the software pattern, a time between downloads of the software pattern, and a number of downloads of the software pattern.

Additionally, the impact of the software pattern may be used to determine whether to allocate resources to the maintenance of the software pattern. The maintenance of the software pattern may include one or more of updating the software pattern; documenting the software pattern; and promoting the software pattern within an organization. The information about the impact of the software pattern may be stored in a repository. Further, the at least one software pattern metric may be stored in a repository.

In another implementation, a computer program product residing on a computer readable medium has a plurality of instructions stored thereon, which, when executed by a processor, cause the processor to perform operations including: querying a software environment to determine the type of use of at least one software pattern; collecting at least one software pattern metric; and determining an impact of the at least one software pattern within a development environment based on, at least in part, the at least one software pattern metric.

The computer program product may include one or more of the following features. The operations may further include providing, to at least one user, information about the impact of the at least one software pattern. The at least one software pattern may include a software recipe. Querying the software environment may include one or more of: identifying one or more software patterns registered within the software environment; identifying function calls made to instantiate a software pattern; and identifying function calls made by at least one instantiated software pattern. The impact of the software pattern may be based upon, at least in part, one or more of: a number of input parameters; a number of output parameters; a subsidiary use of the output of the software pattern; a ratio of the size of an input model to the size of an output model; a ratio of inputs of the software pattern to outputs of the software pattern; a number of dependent software patterns; a type of use within a development process; a number of subsidiary elements used within the software pattern; a type of subsidiary elements used within the software pattern; a number of output artifacts without modification; and a determination of the type of software pattern that is chosen from the list comprising: a modeling software pattern type; a software code type; and a text based artifact type.

One or more software pattern metrics may include one or more of: a number of software pattern implementations; a time between instantiations of the software pattern; a number of instantiations of the software pattern; a per capita number of instantiations of the software pattern by at least one user; a number of reapplications of the software pattern; a number of modified regions within an output artifact of the software pattern; a determination of whether the software pattern is used during development of the software pattern; a history of check-ins and check-outs of the software pattern; a history of check-ins and check-outs of artifacts related to the software pattern; a measure of retention of output artifacts of the software pattern; a measure of deletion of output artifacts of the software pattern; a number of input parameters that are the same across multiple instantiations of the software pattern; a number of output parameters that are the same across multiple instantiations of the software pattern; a time between downloads of the software pattern; and a number of downloads of the software pattern.

Additionally, the impact of the software pattern may be used to determine whether to allocate resources to the maintenance of the software pattern. The maintenance of the software pattern may include one or more of: updating the software pattern; documenting the software pattern; and promoting the software pattern within an organization. The information about the impact of the software pattern may be stored in a repository. Further, the at least one software pattern metric may be stored in a repository.

BRIEF DESCRIPTION OF THE DRAWINGS

Like reference symbols in the various drawings denote like elements.

DETAILED DESCRIPTION OF THE PREFERRED EMBODIMENTS

Figure 1:
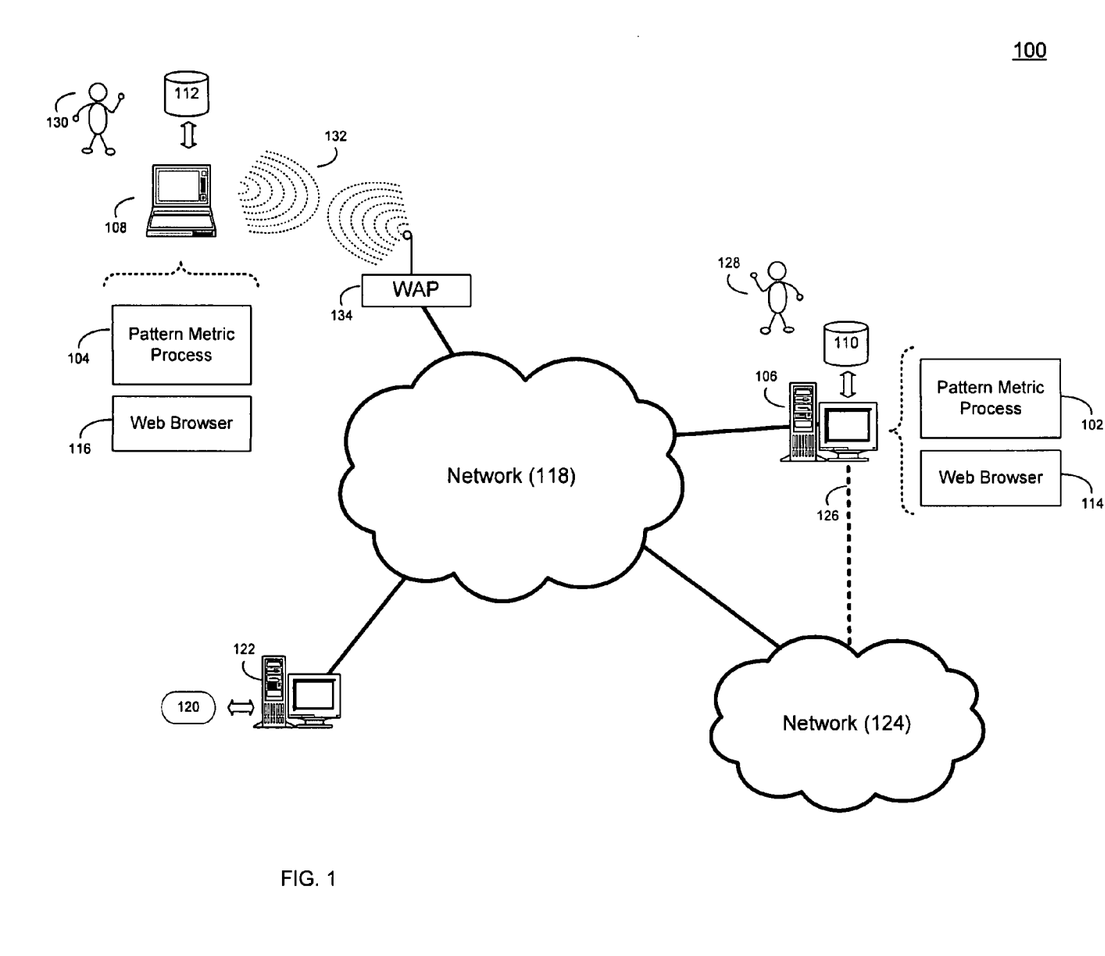
FIG. 1 diagrammatically depicts a system and architecture view of a pattern metric process coupled to a distributed computing network

System Overview:

A system and architecture 100 for a pattern metric process is shown in FIG. 1. As will be discussed below in greater detail, a pattern metric process (e.g., pattern metric processes 102, 104) may query a software environment to determine how one or more software pattern is used. Pattern metric processes 102, 104 may collect one or more software pattern metrics, and may determine an impact of the one or more software pattern within a development environment.

The pattern metric process (e.g., pattern metric processes 102, 104) may reside on a computing device, examples of which may include, but are not limited to a desktop computer (e.g., desktop computer 106), on a laptop computer (e.g., laptop computer 108). Although not shown, the pattern metric process may reside on any device capable of executing software, such as a personal digital assistant ("PDA"), cell phone, mainframe computer, gaming console, server computer, etc.

In an embodiment, the pattern metric process (e.g., pattern metric processes 102, 104) may be a computer program product that contains instructions executable by one or more processors. The instruction sets and subroutines of the pattern metric process (e.g., pattern metric processes 102, 104), which may be stored on a storage device (e.g., storage devices 110, 112, respectively), may be executed by one or more processors (not shown) and one or more memory architectures (not shown), such as processors residing in desktop computer 106 or laptop computer 108, for example. The instructions may be any type of compiled, interpreted, or hardware-based instructions including, but not limited to, machine code, byte code, script code, micro-code, assembly code and/or electronic circuitry. The instructions may, for example, be generated by software compilation, partial software compilation, manual entry, and/or circuit design and manufacture. The storage device (e.g., storage devices 110, 112) upon which computer program product and/or the instruction sets and subroutines may reside, may include any suitable computer readable medium, including but not limited to: hard disk drives; solid state drives; tape drives; optical drives; RAID arrays; random access memories (RAM); read-only memories (ROM), compact flash (CF) storage devices, secure digital (SD) storage devices, and memory stick storage devices.

In addition/as an alternative to being a client side process, executed by a client computing device, the pattern metric process may be a server-side process residing on an executed by a server computer. Further, the pattern metric process may be a hybrid client-side/server-side process executed in part by a client computing device and in part by a server computer.

Desktop computer 106 and laptop computer 108 may each run network operating systems, examples of which may include, but are not limited to the Microsoft Windows™, Ubuntu Linux™, OS2™, and Sun Solaris™ operating systems.

Pattern metric processes 102, 104 may include a stand alone application or an applet/application/module that is executed within any third-party application (not shown). For example, pattern metric processes 102, 104 may be an applet that runs within a web browser (e.g., web browsers 114, 116), e.g., Internet Explorer™ or Firefox™ web browsers. Additionally, pattern metric processes 102, 104 may be network enabled, i.e., one or more of pattern metric processes 102, 104 may communicate via a network and access resources over a network, such as network 118, e.g., which may include a local area network (LAN), wide area network (WAN), or other data network, such as the Internet. Network resources may include, but are not limited to, printers, servers, peer computers, telephone systems, game consoles, scanners, etc. For example, pattern metric processes 102, 104, residing on desktop computer 106 and laptop computer 108, respectively, may access repository 120 residing on server computer 122 via network 118.

Server computer 122 may be any type of server computer. For example, Server computer 122 may be a PC server, a mainframe computer, a file server, a VAX™ server, etc. Server computer 122 may run a network operating system, including, but not limited to: Windows 2003 Server™, Redhat Linux™, or z/OS™. Server computer 122 may also execute one or more server applications. For example, server computer 122 may execute a web server application, examples of which include the Microsoft IIS™, Novell Webserver™, or Apache Webserver™ web server applications, that allow for Hyper Text Transfer Protocol ("HTTP") access to server computer 122 via network 118. Server computer 122 may also execute a database application, such as the SQL Server™, MySQL™, and Oracle™ database applications, for example.

Additionally, network 118 may be connected to one or more secondary networks (e.g., network 124), examples of which may include but are not limited to: a local area network, a wide area network, or an intranet, for example. Devices coupled to network 118, such as desktop computer 106, may be directly coupled to network 118, or may be coupled through secondary network 124 as illustrated with phantom link line 126.

Users 128, 130 may access pattern metric processes 102, 104 directly through the devices on which pattern metric processes 102, 104 are executed, namely desktop computer 106 and laptop computer 108, for example, or indirectly through networks 118, 124. Users (e.g., users 128, 130) may also access server computer 122 and repository 120 directly through network 118 and/or through secondary network 124.

The computing devices (e.g., desktop computer 106, laptop computer 108) may be physically or wirelessly coupled to network 118 (or network 124). For example, desktop computer 106 is shown directly coupled to network 118 via a hardwired network connection. Server computer 122 is also shown directly coupled to network 118 via a hardwired network connection. Laptop computer 108 is shown wirelessly coupled to network 118 via wireless communication channel 132 established between laptop computer 108 and wireless access point ("WAP") 134, which is shown directly coupled to network 118. WAP 134 may be, for example, an IEEE 802.11a, 802.11b, 802.11g, Wi-Fi, and/or Bluetooth device that is capable of establishing wireless communication channel 132 between laptop computer 108 and WAP 134.

The Pattern Metric Process:

As discussed, a pattern may be a proven, best practice solution to a known problem within a given context. For example, a pattern may be a general, reusable, customizable design solution to a software design problem; it be a description, template, model, code sample, or other mechanism that facilitates a design solution. A pattern of software patterns may be defined as a software recipe ("recipe"). Different types of patterns and recipes exist. Although not an exhaustive list, examples include: an idiom pattern that may comprise sections of code, a design pattern that may include various software classes, and an architectural pattern that may provide an architectural level solution. Examples of patterns well known in the art may include, for example, the Model-View-Controller pattern, which is a well known architectural pattern. In many cases, a pattern may describe relationships and interactions between classes and/or objects without specifying a final solution. Indeed, a pattern, when instantiated, may benefit a code developer by facilitating a design solution, but the pattern may also lend itself to customization so that the code developer can tailor the pattern to his or her specific application.

A developer or organization may wish to employ software pattern metrics as a way to understand the use and impact of software patterns within the software environment and the organization. For the convenience of explanation, pattern metric process 102 will be described in detail below. However, this should not be construed as a limitation on the present disclosure, as other pattern metric processes (e.g., pattern metric process 104) may be equally utilized.

Figure 2:
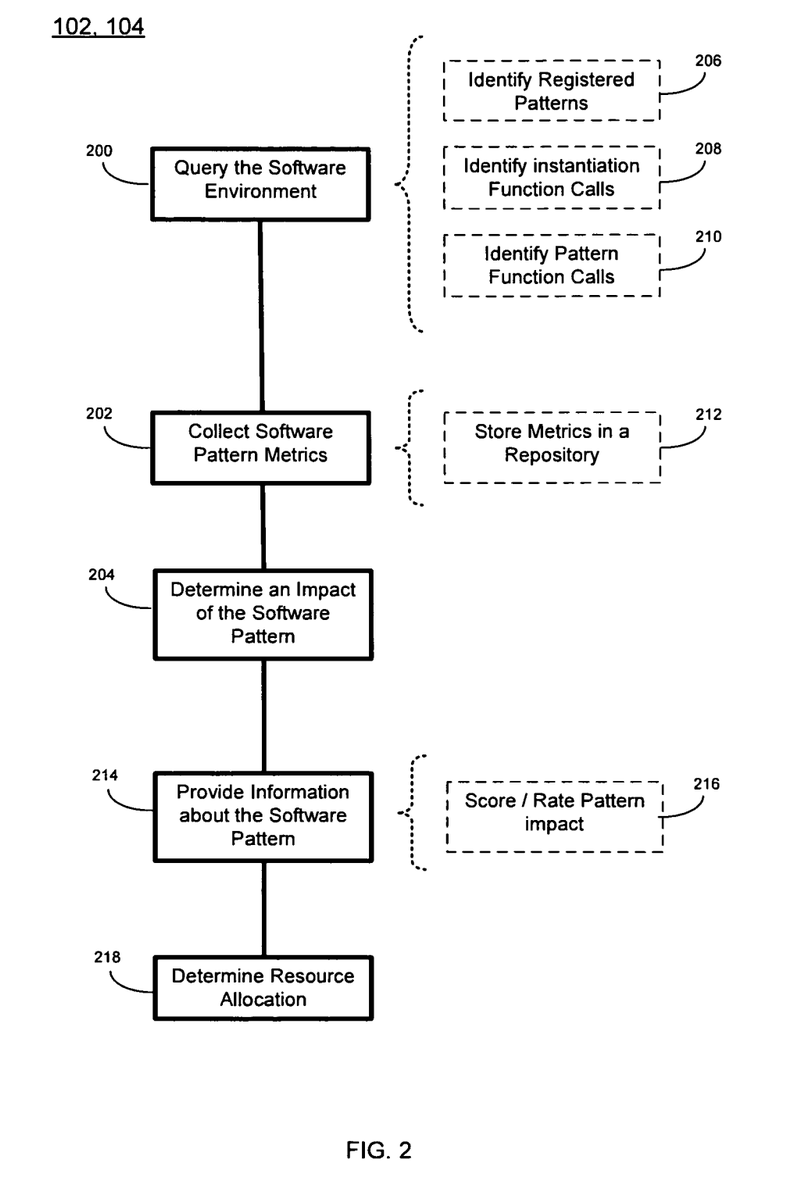
FIG. 2 is a flowchart of a process performed by the pattern metric process of FIG. 1.

Referring also to FIG. 2, pattern metric process 102 may query 202 a software environment to determine the type of use of at least one software pattern. The software environment may be a collection of tools, data, documentation, and other resources that affect and facilitate software development.

Some software environments may allow a developer (e.g., user 128) to register patterns within the software environment. For example, if a developer uses a pattern or a set of patterns, the software environment may have a feature that keeps track of which patterns are used. Pattern metric process 102 may query 202 the software environment for information about patterns registered within the software environment. If the developer (e.g., user 128) is using an integrated development environment ("IDE"), for example, the IDE may provide a mechanism that may allow user 128 to enter the name of any pattern that user 128 is using. Alternatively, the software environment may automatically recognize that user 128 is using one or more specific patterns and may keep track of which patterns user 128 is using, how many patterns user 128 is using, how many times each pattern is instantiated within the software environment, and any other information relating to the use of the pattern. The software environment may also track other information regarding which patterns are used by user 128. Some methods of registering and tracking information regarding software patterns by the software environment include, but are not limited to: maintaining a configuration file, tracking pattern instantiation, tracking pattern inputs, and tracking pattern outputs.

Additionally, some software environments may allow user 128 to choose a pattern to implement. For example, a software environment may provide a list of software patterns, and, once user 128 chooses one or more patterns, the software environment may instantiate, register, and/or keep track of the patterns used.

As stated, By querying 202 the software environment, pattern metric process 102 may identify 204 one or more software patterns registered within the software environment. Pattern metric process 102 may also monitor and identify function calls made to instantiate a software pattern. For example, and as stated, the software environment may allow user 128 to instantiate a software pattern within user 128's solution. When user 128 instantiates a software pattern, the software environment may initiate certain function calls in order to effectuate the instantiation of the software pattern. Pattern metric process 102 may be integrated with the software environment and may monitor (e.g. trap) and identify 206 the certain function calls. By identifying 206 the function calls that instantiate a pattern, pattern metric process 102 may ascertain information about the pattern being instantiated. For example, if user 128 directs the software environment to instantiate a particular pattern, the software environment may then initiate function calls to perform the instantiation. By monitoring and identifying 206 those function calls, pattern metric process 102 may gather information regarding the particular pattern including, but not limited to: the name of the pattern, the number of inputs to the pattern, the number of outputs to the pattern, the type of pattern, the size of the pattern, or any other information related to the pattern.

Pattern metric process 102 may also identify 208 function calls made by at least one instantiated software pattern. As stated, a developer (e.g., user 128) may include one or more patterns within a solution. Once the one or more patterns are instantiated, the one or more patterns may initiate function calls. An instantiated pattern may be a software model, may include instantiated code, and/or may produce output code, for example. An instantiated pattern may also have specific inputs and outputs including, but not limited to: integers, functions, sockets, and/or other patterns, for example. Pattern metrics process 102 may monitor any or all functions associated with and/or called by the instantiated pattern. By monitoring these functions, pattern metrics process 102 may be able to identify the instantiated pattern, and may be able to gather information about the instantiated pattern, including, but not limited to: the name of the pattern, the number and type of inputs and outputs of the pattern, the function names associated with the pattern, and any information about the instantiated pattern.

As stated, pattern metrics process 102 may query 202 the software environment which may include, but is not limited to, identifying 204 patterns registered within the software environment, identifying 206 pattern instantiation function calls, and identifying 208 function calls initiated by an instantiated pattern.

Additionally, pattern metric process 102 may identify 210 patterns of patterns. A pattern of patterns may be described as a software recipe.

As pattern metric process 102 collects information about the software patterns themselves, pattern metric process 102 may also collect at least one software pattern metric. Pattern metric process 102 may also store 212 the software pattern metrics in a repository, such as repository 114, so that they may be archived and accessed at a future time. Repository 114 may be a database that holds software pattern metrics and information. The database may be instantiated via database software and may be, for example, an Oracle™ database, a SQL™ database, a flat file database, an XML database, a custom database, or any other form of database.

Many different metrics and types of metrics may be collected 210 by pattern metric process 102 and stored 212 in the repository. The following list details some of the types of metrics that may be collected 210.

The software pattern metrics may include: a number of software pattern implementations. For example, pattern metric process 102 may collect 212 the number of patterns implemented within the solution. A solution may implement more than one pattern and/or include a single pattern multiple times. Pattern metric process 102 may collect 210 and store 212 any and all information relating to the number of pattern implementations within the solution.

The software pattern metrics may also include: a number of instantiations of a software pattern. Developers may instantiate patterns within the solution multiple times. Pattern metric process 102 may collect 210 information relating to the number of times each pattern is instantiated.

The software pattern metrics may also include: a time between instantiations of a software pattern. Developers may instantiate one or more patterns within the solution multiple times. Pattern metric process 102 may collect 210 information relating to the time elapsed between one or more pattern instantiations.

The software pattern metrics may also include: a per capita number of instantiations of a software pattern by at least one user. Each developer or user may instantiate one or more patterns. Pattern metric process 102 may collect 210 information regarding which patterns are instantiated by each developer, and how many times each pattern is instantiated by each developer.

The software pattern metrics may also include: a number of reapplications of a software pattern. A developer may reapply a pattern within a solution, or a developer may reapply a pattern in various other solutions. For example, a developer may apply a pattern, create some customizations, then reapply the pattern afresh. Likewise, during the development process, a developer may apply a pattern, remove the pattern, then reapply the pattern to the solution. Pattern metric process 102 may collect 102 information regarding initial applications and reapplications of patterns and may differentiate between initial application and reapplications of patterns.

The software pattern metrics may also include: a number of modified regions within an output artifact of a software pattern. During the development process, a developer may customize a pattern to tailor the pattern to a particular solution. During this process, the developer may modify the pattern so that the output of the modified pattern is different from the output of the unmodified pattern. Alternatively, a developer may modify the pattern output directly. Pattern metric process 102 may collect 210 information regarding the modified output of a pattern, including a number of modified regions of the output of the pattern.

The software pattern metrics may also include: a determination of whether the software pattern is used during development of a software pattern. A software pattern may be used during the development of a software pattern. For example, a developer may wish to create a new software pattern. Since patterns facilitate development solutions, the developer may use one or more patterns to help design the new pattern. Alternatively, a developer, during development of a pattern, may download, instantiate, apply, and test the pattern that is currently under development. Pattern metric process 102 may collect 210 information regarding whether a software pattern is used during development of a software pattern.

The software pattern metrics may also include: a history of check-ins and check-outs of a software pattern. During development a developer may check a pattern in and out of a configuration management tool, or in an out of another tool that allows for checking in and out of software patterns. Pattern metric process 102 may collect 210 information regarding the checking in and out of a software pattern, including, but not limited to, the history of check-ins and check-outs of a software pattern.

The software pattern metrics may also include: a history of check-ins and check-outs of artifacts related to a software pattern. During development a developer may check artifacts related to a pattern in and out of a configuration management tool, or in and out other tool that allows for checking in and out of artifacts related to software patterns. Artifacts related to a software pattern may be, for example, input to the pattern, output of the pattern, test data, test results, documentation, or any other file, information, data, or thing related to the software pattern. Pattern metric process 102 may collect 210 information regarding the checking in and out of artifacts related to a software pattern, including, but not limited to, the history of check-ins and check-outs of a artifacts related to a software pattern.

The software pattern metrics may also include: a measure of retention of output artifacts of a software pattern. Pattern metric process 102 may collect 210 information about whether the output artifacts of a pattern have been retained or discarded.

The software pattern metrics may also include: a measure of deletion of output artifacts of a software pattern. Pattern metric process 102 may collect 210 information about whether the output artifacts of a pattern have been retained or discarded.

The software pattern metrics may also include: a number of input parameters that are the same across multiple instantiations of a software pattern. During development, a developer may, for example, create multiple instantiations of a software patterns. The developer may customize each instantiation of the software pattern such that each instantiation of the pattern is a unique instantiation. One possibility is that the developer may customize different instantiations of the software pattern such that the input parameters of each instantiation differ. Pattern metric process 102 may collect 210 information relating to a number of input parameters that are the same, or that differ, between instantiations of a software pattern.

Similarly, the software pattern metrics may also include: a number of output parameters that are the same across multiple instantiations of the software pattern. Similarly to the case of input parameters above, a developer may, for example, customize instantiations of a software pattern such that the output parameters of each instantiation differ. Pattern metric process 102 may collect 210 information regarding a number of output parameters that are the same, or that differ, between instantiations of a software pattern.

The software pattern metrics may also include: a number of downloads of the software pattern A developer, or a group of developers, may download a software pattern multiple times. Pattern metric process 102 may collect 210 information regarding the number of times a software pattern has been downloaded.

The software pattern metrics may also include: a time between downloads of the software pattern. A developer, or a group of developers, may download a software pattern multiple times. Pattern metric process 102 may collect 210 information regarding the time between downloads of a software pattern.

The list of pattern metrics above is not an all inclusive list; pattern metric process 102 may collect 210 any data or information regarding software patterns. The data or information may take any form, including, but not limited to: statistical data, textual data, numeric data, tabular data, categorical data, ordinal data, nominal data, binary data, and measurement data. As is understood in the art, any data or information relating to a software pattern, the use of a software pattern, and/or the development of a software pattern may be collected 210 and stored 212 in a software metric repository, such as repository 114.

Pattern metrics may be useful in determining 214 the impact of a software pattern within a development environment. As such, pattern metric process 102 may also determine 214 an impact of the at least one software pattern within a development environment based on the at least one software pattern metric. Each metric may have an effect on the impact of the software pattern. For example, if a pattern is downloaded often, the pattern may have a greater impact than a pattern that is downloaded infrequently. Likewise, if the output artifacts of a pattern are retained, the pattern may have a greater impact than that of a pattern where the output artifacts are discarded. A developer or organization may wish to understand which patterns have a large impact on the individual or organization and which patterns have a smaller impact on the individual or organization. For example, a pattern that has a large impact may be more useful during development. Additionally, a developer or organization may wish to understand which patterns have a larger impact so that the developer or organization may make an informed decision about whether to invest resources in the pattern. For example, a developer or organization may wish to provide support and maintenance to only those patterns that have a greater impact on, and are more important to, the developer or organization. As is understood in the art, each pattern metric and/or element of information about a pattern may be used as a measurement to determine whether a pattern has a great impact or a small impact Accordingly, pattern metric process 102 may determine 214 an impact of the at least one software pattern within a development environment based on the at least one software pattern metric. The impact may be based upon various factors. The following list includes some of the factors that may affect the impact of a pattern:

The impact of a pattern may be based on: a number of input parameters. For example, if a pattern has a large number if input parameters, or voluminous input parameters, the pattern may have a particular impact on the environment.

The impact of a pattern may be based on: a number of output parameters. For example, if a pattern has a large number of output parameters, or voluminous output, the pattern may have a particular impact on the environment.

The impact of a pattern may be based on: a subsidiary use of the output of the software pattern. It may be deemed that the output of a pattern is useful in multiple contexts. For example, the output of an accounting pattern that facilitates an accounting solution may also be applicable for another, subsidiary purpose, such as the monitoring and management of securities offerings. The use of a pattern in subsidiary applications may indicate an impact of the pattern.

The impact of a pattern may be based on: a ratio of the size of an input model to the size of an output model. For example, the ratio of input model size to output model size may indicate the amount of work generated by a software pattern, and therefore may indicate a level of impact.

The impact of a pattern may be based on: a ratio of inputs of the software pattern to outputs of the software pattern. For example, the ratio of the number of inputs to the number of outputs of a software pattern relate to the amount of work generated by a software pattern, and thus, the ratio of inputs to outputs may indicate an impact of the pattern.

The impact of a pattern may be based on: a number of dependent software patterns. Software patterns may relate to other software patterns; they may link to other software patterns, they may instantiate other software patterns, they may contain other software patterns, they may recursively include or instantiate other software patterns, they may, in various ways, rely on other software patterns. If a first software pattern has a large number of dependant software patterns, it may indicate that the scope and impact of the first software pattern is broad. A large number of software patterns may also indicate that pattern maintenance may be expensive if, for example, the maintenance of the first software pattern necessitates maintenance of the dependant software patterns. The number of dependent patterns may also indicate in impact of the pattern.

The impact of a pattern may be based on: a type of use within a development process. The type of use of a software pattern within the development process may also indicate the impact of the software pattern. For example, an architectural pattern may have a large impact if it affects the overall architectural structure of a development project. Conversely, an idiom pattern or a pattern with text based artifacts may have a lesser impact if it affects only a portion of the development project. Additionally, a code pattern or model pattern may have an intermediate impact if it touches significant portions, but not all portions, of the development project. In general, the type of use of the pattern may indicate an impact of the pattern.

The impact of a pattern may be based on: a number of subsidiary elements and/or a type of subsidiary elements within the software pattern. The number and type of subsidiary elements may affect the impact of the pattern. For example, a pattern that adds or imports multiple packages, files, data, patterns, information, etc., may implicate an impact of the pattern.

The impact of a pattern may be based on: a number of output artifacts without modification. For example, if a large number of output artifacts of the pattern are used without modification, it may affect the impact of the pattern on the organization. If the output artifacts are modified, it may indicate that the output of the pattern is used regularly within an organization and has a large impact. Alternatively, if a large number of output artifacts of a software pattern are used without modification, it may indicate that the pattern is producing efficient output and, without any changes, has a particular impact.

The impact of a pattern may be based on: a determination of the type of software pattern. As stated, the scope and context of the pattern may affect the impact of the software pattern. A pattern with a large scope and context may have a large effect and impact on the organization, whereas a pattern with a smaller scope and context may have a smaller impact on the organization.

A user or organization may wish to understand the impact of a software pattern. Accordingly, pattern metric process 102 may provide 216 information about the impact of the at least one software pattern. As is understood in the art, pattern metric process 102 may provide 216 pattern information, pattern impact information, and/or pattern metric information in various ways. Pattern metric process may include, for example, a graphical user interface ("GUI") that users, such as users 122, 124 may access to view the information about the impact of the pattern. Additionally or alternatively, pattern metric process 102 may provide 216 one or more reports that contain information about a software pattern, the impact of a software pattern, and/or software pattern metrics. Pattern metric process 216 may also score and/or rate 218 of the impact of the software pattern; the score and/or rating may compare the impact of a particular pattern to the impact of other patterns within the organization and may be included as at least part of the information provided 216 by pattern metric process 216.

Additionally, the pattern metric process 102 may use the impact of the software pattern to determine 220 whether to allocate resources to the maintenance of the software pattern. If the impact of the software pattern is large, for example, the user or organization may want to allocate resources to update, document, and/or promote the software pattern within the organization. Conversely, if the impact of the software pattern is small, the software pattern may not be as valuable to the organization and the organization may not want to spend resources maintaining the software pattern. In general, the impact of the software pattern, whether the impact is large or small, may be used to determine 220 whether to invest resources in the pattern. In one implementation, a software pattern impact threshold may be set such that, if an impact of the pattern is, for example, greater than the threshold, pattern metric process 102 will determine 220 that resources should be allocated to the maintenance of the pattern. Other methods of determining 220 whether to allocate resources to pattern maintenance may be used, including, but not limited to: generation of a statistical measurement, a manual determination by a user, sorting of all pattern impacts to determine the most important patterns, or any other method of determining 220 whether to allocate resources to a pattern.

As stated, patterns are reusable assets, opportunities to improve efficiency of the maintenance and use of patterns exist. However, identification and tracking of those opportunities is often difficult. Also, as with any asset, the maintenance, documentation, creation, and management of patterns consumes money and resources. A system that queries 202 a software environment, collects 210 software pattern metrics, determines 214 an impact of a software pattern, provides 216 information about a software pattern, and/or determines 220 whether to allocate resources to a software pattern may facilitate the use of patterns by an individual and/or within an organization.

A number of implementations have been described. Nevertheless, it will be understood that various modifications may be made. Accordingly, other implementations are within the scope of the following claims.

What is claimed is:

1. A method of tracking software pattern metrics comprising:
   automatically recognizing, via one or more computing devices, a use of at least one software pattern in a software environment;
   collecting, via the one or more computing devices, at least one software pattern metric related to the software pattern, wherein the at least one software pattern metric includes a number of instantiations of the software pattern, including information regarding which of the at least one of the software pattern instantiations are instantiated by at least one user and time intervals between the number of instantiations of the software pattern; and
   determining, via the one or more computing devices, an impact of the at least one software pattern within a development environment based on, at least in part, the at least one software pattern metric, wherein the impact of the at least one software pattern is based on at least one of a number of input parameters and a number of output parameters, wherein a larger number of input parameters indicates a higher impact than a lower number of input parameters and wherein a larger number of output parameters indicates a higher impact than a lower number of output parameters, wherein input parameters are artifacts attached to the software pattern as input and output parameters are generated based upon applying the software pattern; and
   providing, to at least one user, information about the impact of the at least one software pattern.

2. The method of claim 1 wherein the at least one software pattern includes a software recipe.

3. The method of claim 1 further including querying the software environment, wherein querying the software environment includes one or more of:
   identifying one or more software patterns registered within the software environment;
   identifying function calls made to instantiate a software pattern; and
   identifying function calls made by at least one instantiated software pattern.

4. The method of claim 1 wherein the impact of the software pattern is based upon, at least in part, one or more of:
   a subsidiary use of the output of the software pattern;
   a ratio of the size of an input model to the size of an output model;
   a ratio of inputs of the software pattern to outputs of the software pattern;
   a number of dependent software patterns;
   a type of use within a development process;
   a number of subsidiary elements used within the software pattern;
   a type of subsidiary elements used within the software pattern;
   a number of output artifacts without modification; and
   a determination of the type of software pattern that is chosen from the list comprising:
      a modeling software pattern type;
      a software code type; and
      a text based artifact type.

5. The method of claim 1 wherein the at least one software pattern metric includes one or more of:

a number of software pattern implementations;
a number of reapplications of the software pattern;
a number of modified regions within an output artifact of the software pattern;
a determination of whether the software pattern is used during development of the software pattern;
a history of check-ins and check-outs of the software pattern;
a history of check-ins and check-outs of artifacts related to the software pattern;
a measure of retention of output artifacts of the software pattern;
a measure of deletion of output artifacts of the software pattern;
a number of input parameters that are the same across multiple instantiations of the software pattern;
a number of output parameters that are the same across multiple instantiations of the software pattern;
a time between downloads of the software pattern; and
a number of downloads of the software pattern.

6. The method of claim 1 further including using the impact of the software pattern to determine whether to allocate resources to the maintenance of the software pattern.

7. The method of claim 6 wherein the maintenance of the software pattern includes one or more of:
updating the software pattern;
documenting the software pattern; and
promoting the software pattern within an organization.

8. The method of claim 1 further including at least one of:
storing the information about the impact of the software pattern in a repository; and
storing the one or more software pattern metrics in a repository.

9. A computer program product residing on a non-transitory computer readable medium having a plurality of instructions stored thereon, which, when executed by a processor, cause the processor to perform operations including:
automatically recognizing a use of at least one software pattern in a software environment;
collecting at least one software pattern metric related to the software pattern, wherein the at least one software pattern metric includes a number of instantiations of the software pattern, including information regarding which of the at least one of the software pattern instantiations are instantiated by at least one user and time intervals between the number of instantiations of the software pattern; and
determining an impact of the at least one software pattern within a development environment based on, at least in part, the at least one software pattern metric, wherein the impact of the at least one software pattern is based on at least one of a number of input parameters and a number of output parameters, wherein a larger number of input parameters indicates a higher impact than a lower number of input parameters and wherein a larger number of output parameters indicates a higher impact than a lower number of output parameters, wherein input parameters are artifacts attached to the software pattern as input and output parameters are generated based upon applying the software pattern; and providing, to at least one user, information about the impact of the at least one software pattern.

10. The computer program product of claim 9 wherein the at least one software pattern includes a software recipe.

11. The computer program product of claim 9 further including querying the software environment, wherein querying the software environment includes one of more of:
identifying one or more software patterns registered within the software environment;
identifying function calls made to instantiate a software pattern; and
identifying function calls made by at least one instantiated software pattern.

12. The computer program product of claim 9 wherein the impact of the software pattern is based upon, at least in part, one or more of:
a subsidiary use of the output of the software pattern;
a ratio of the size of an input model to the size of an output model;
a ratio of inputs of the software pattern to outputs of the software pattern;
a number of dependent software patterns;
a type of use within a development process;
a number of subsidiary elements used within the software pattern;
a type of subsidiary elements used within the software pattern;
a number of output artifacts without modification; and
a determination of the type of software pattern that is chosen from the list comprising:
a modeling software pattern type;
a software code type; and
a text based artifact type.

13. The computer program product of claim 9 wherein the at least one software pattern metric includes one or more of:
a number of software pattern implementations;
a number of reapplications of the software pattern;
a number of modified regions within an output artifact of the software pattern;
a determination of whether the software pattern is used during development of the software pattern;
a history of check-ins and check-outs of the software pattern;
a history of check-ins and check-outs of artifacts related to the software pattern;
a measure of retention of output artifacts of the software pattern;
a measure of deletion of output artifacts of the software pattern;
a number of input parameters that are the same across multiple instantiations of the software pattern;
a number of output parameters that are the same across multiple instantiations of the software pattern;
a time between downloads of the software pattern; and
a number of downloads of the software pattern.

14. The computer program product of claim 9 wherein the operations further include using the impact of the software pattern to determine whether to allocate resources to the maintenance of the software pattern.

15. The computer program product of claim 14 wherein the maintenance of the software pattern includes one or more of:
updating the software pattern;
documenting the software pattern; and
promoting the software pattern within an organization.

16. The computer program product of claim 9 wherein the operations further include at least one of:
storing the information about the impact of the software pattern in a repository; and
storing the one or more software pattern metrics in a repository.

17. The method of claim 1, further comprising:
comparing the impact of the software pattern to an impact of one or more other software patterns in the development environment.

18. The method of claim 17, further comprising:
scoring the impact of the software pattern based upon, at least in part, the comparison.

\* \* \* \* \*